US012810293B2

(12) United States Patent
Bhatt et al.

(10) Patent No.: US 12,810,293 B2
(45) Date of Patent: Nov. 24, 2026

(54) SYSTEMS AND METHODS FOR CONTEXT-DRIVEN GENERATIVE ARTIFICIAL INTELLIGENCE (AI) BASED PRE-AUTHORIZATION

(71) Applicant: Mastercard International Incorporated, Purchase, NY (US)

(72) Inventors: Deepak Bhatt, O'Fallon, MO (US); Jake Menzel, Wildwood, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 18/956,703

(22) Filed: Nov. 22, 2024

(65) Prior Publication Data

US 2026/0148229 A1 May 28, 2026

(51) Int. Cl.
*G06Q 20/40* (2012.01)

(52) U.S. Cl.
CPC .................................. *G06Q 20/401* (2013.01)

(58) Field of Classification Search
CPC .................................................... G06Q 20/401
See application file for complete search history.

(56) References Cited

U.S. PATENT DOCUMENTS 12,062,051 B2 8/2024 Yerradoddi et al.
2015/0058220 A1* 2/2015 Cazanas ............ G06Q 20/3263 705/44
2020/0364718 A1 11/2020 Hindi et al.
2021/0027296 A1 1/2021 Mullaney et al.
2021/0166238 A1 6/2021 Bharghavan et al.
2021/0233088 A1* 7/2021 Mehrotra ............... G06Q 20/22
2021/0311788 A1* 10/2021 Castinado ............... G06F 9/547
2021/0357940 A1* 11/2021 Benkreira .......... G06Q 20/3224
2022/0261875 A1* 8/2022 Vashisht .................. G06N 3/08

(Continued)

FOREIGN PATENT DOCUMENTS

CN 118096373 A 5/2024

OTHER PUBLICATIONS

International Search Report and Written Opinion for PCT Application No. PCT/US2025/050031 (Dated Feb. 2, 2026).

(Continued)

*Primary Examiner* — Scott S Trotter
(74) *Attorney, Agent, or Firm* — Hovey Williams LLP

(57) ABSTRACT

A system/method includes a processor configured to: generate, via a first machine learning (ML) model, a database query for real-time authorization of a transaction authorization request, the transaction authorization request including a customer account identifier and a merchant identifier; retrieve, using the database query, an account behavior description for a customer account identified by the customer account identifier; generate a transaction authorization prompt based on the account behavior description; submit the transaction authorization prompt to a second ML model comprising an LLM to generate an authorization recommendation; transmit the authorization recommendation and the transaction authorization request to an issuer of the customer account; receive a response to the transaction authorization request from the issuer; and approve or deny a transaction corresponding to the transaction authorization request based on the response.

20 Claims, 5 Drawing Sheets

(56) References Cited

U.S. PATENT DOCUMENTS

| | | | |
|---|---|---|---|
| 2023/0385844 A1 | 11/2023 | Laptiev et al. | |
| 2024/0169331 A1 | 5/2024 | Kolchin | |
| 2024/0304316 A1 | 9/2024 | Mehrhoff et al. | |
| 2024/0386015 A1 | 11/2024 | Crabtree et al. | |
| 2025/0390869 A1* | 12/2025 | Pareek | G06Q 20/401 |

OTHER PUBLICATIONS

International Search Report and Written Opinion for PCT Application No. PCT/US2025/050036 (Dated Feb. 3, 2026).

* cited by examiner

SYSTEMS AND METHODS FOR CONTEXT-DRIVEN GENERATIVE ARTIFICIAL INTELLIGENCE (AI) BASED PRE-AUTHORIZATION

FIELD OF THE INVENTION

The present disclosure generally relates to computer-implemented methods, systems comprising computer-readable media, and electronic devices for context-driven generative artificial intelligence (AI) based financial transaction analyses and, more particularly, to a system for using large language model (LLM) prompts prepared with pre-calculated account description vectors for transaction analyses.

BACKGROUND

Manual financial transaction analyses—for example, supporting fraud identification and/or transaction approval—require huge expenditures of time and are comparatively slow. Moreover, existing transaction analysis processes often lack context and/or are formulated based on old information and/or correlations.

This background discussion is intended to provide information related to the present invention which is not necessarily prior art.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a system is provided for transaction authorization. The system includes one or more processors and a memory device storing computer-executable instructions thereon that, when executed by the one or more processors, cause the one or more processors to: generate, via a first machine learning (ML) model, a database query for real-time authorization of a transaction authorization request, the transaction authorization request including a customer account identifier and a merchant identifier; retrieve, using the database query, an account behavior description for a customer account identified by the customer account identifier; generate a transaction authorization prompt based on the account behavior description; submit the transaction authorization prompt to a second ML model comprising an LLM to generate an authorization recommendation; transmit the authorization recommendation and the transaction authorization request to an issuer of the customer account; receive a response to the transaction authorization request from the issuer; and approve or deny a transaction corresponding to the transaction authorization request based on the response. The system may include instructions that, when executed, may cause the one or more processors to perform additional, less, or alternate actions, including those discussed elsewhere herein.

In another aspect, computer readable storage media are provided. The media have computer-executable instructions stored thereon for transaction authorization. When executed by at least one processor, the computer-executable instructions cause the at least one processor to: generate, via a first machine learning (ML) model, a database query for real-time authorization of a transaction authorization request, the transaction authorization request including a customer account identifier and a merchant identifier; retrieve, using the database query, an account behavior description for a customer account identified by the customer account identifier; generate a transaction authorization prompt based on the account behavior description; submit the transaction authorization prompt to a second ML model comprising an LLM to generate an authorization recommendation; transmit the authorization recommendation and the transaction authorization request to an issuer of the customer account; receive a response to the transaction authorization request from the issuer; and approve or deny a transaction corresponding to the transaction authorization request based on the response. The computer-executable instructions may cause the at least one processor to perform additional, less, or alternate actions, including those discussed elsewhere herein.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
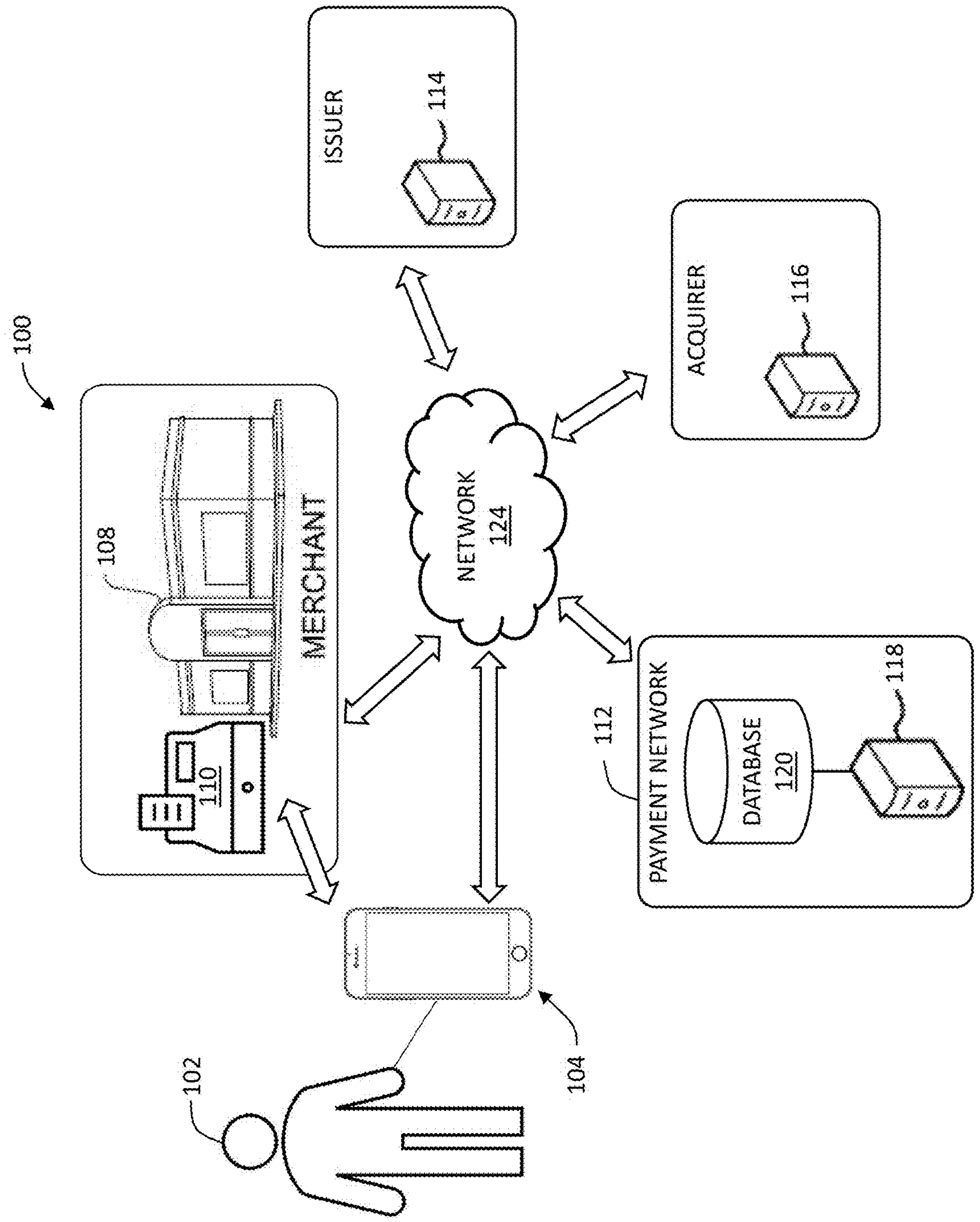
FIG. 1 is a schematic diagram illustrating an exemplary multiparty payment network system for processing payment card transactions.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

Broadly, the systems and methods of the disclosure support fraud identification, dispute resolution and/or transaction approval that is faster and more accurate, owing to technological improvements described herein. For example, in one or more embodiments, pre-calculated, machine-readable vectors are stored in a database for quick and efficient access by automated search logic. The vectors may be identified and retrieved, for example, using real-time semantic searching implemented by a large language model (LLM) in response to a need for a recommendation. In one or more embodiments, the recommendation may relate to whether a transaction should be authorized and/or to resolving a chargeback dispute. The pre-calculated vector(s) retrieved by the search logic LLM may—in the form retrieved and/or as further enriched by account-specific data—be included in a prompt to a second, recommendation LLM. The recommendation LLM may be configured and fine-tuned to provide the recommendation with greater speed and accuracy than existing systems lacking the search logic LLM, the quick-retrieval vector database, and the corresponding recommendation LLM.

Moreover, the pre-calculated vector(s) may, themselves, be prepared by a machine learning model such as a vector generation LLM. In one or more embodiments, the vectors represent and/or are stored in a graphical model, and are embedded or encoded from raw or otherwise unrefined structured data to the pre-calculated vector(s) by the vector generation LLM, as discussed in more detail below. The flow from raw, structured data to pre-calculated vector(s) capturing relationships, correlations, trends and summaries of account activities facilitated by the unconventional series of machine learning models described herein also represent technological improvements facilitating efficient and accurate fraud identification and/or transaction approval.

One of ordinary skill will appreciate that the database search logic or the vector generation operations may, for example, be configured with or as other machine learning model(s) and/or algorithms within the scope of the present invention.

As used herein, the term "database" includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). SQL, as used herein, stands for structured query language, which is a programming language for storing and processing information in a relational database. It is noted that any database may be used that enables the systems and methods to operate as described herein.

In one or more embodiments, the database 120 may include a single database having separated sections or partitions or may include multiple databases, each being separate from each other. The database 120 may store transaction data generated as part of activities conducted over the processing network 112 including data relating to merchants 108, accountholders 102 or customers, issuers 114, acquirers 116, and/or purchases made. The database 120 may also store account data including cardholder names, cardholder addresses, account numbers, other account identifiers and historical transaction data. The database 120 may also store merchant data that includes identifiers for each merchant registered to use the network, merchant bank account information and historical transaction data. The database 120 may store purchase data associated with items being purchased by a cardholder 102 from a merchant 108, and authorization request data. The database 120 may also store device information, payment card information, and other data involved with processing transactions between one or more parties.

In one or more embodiments, the database 120 also or alternatively includes the pre-calculated, machine-readable vectors stored for quick and efficient access by automated search logic and discussed in more detail throughout this disclosure. The pre-calculated vectors may be enriched versions of, be calculated from and/or reference the other transaction data stored within the database 120, within the scope of the present invention.

One of ordinary skill will appreciate that the data and vectors described above may be stored across multiple distinct databases within the scope of the present invention. For example, the transaction data database may be distinct from the pre-calculated vector database without departing from the spirit of the present invention.

Example System

FIG. 1 is a schematic diagram illustrating an exemplary multiparty payment processing system 100 for processing payment transactions and/or resolving chargeback dispute(s), in accordance with an aspect of the present invention. In the example payment processing system 100, a cardholder 102 may have access to a consumer computing device 104 through which the cardholder 102 may perform a payment transaction with a merchant 108.

Embodiments described herein may relate to a payment card system, such as a payment system using the Mastercard® interchange network. (Mastercard is a registered trademark of Mastercard International Incorporated). The Mastercard interchange network is a set of proprietary communications standards promulgated by Mastercard for the exchange of financial transaction data and the settlement of funds between financial institutions that are members of the Mastercard interchange network. Embodiments described herein may also relate to digital payment services such as Masterpass® by Mastercard or another digital wallet service for a mobile device such as a smartphone.

In payment processing system 100, a financial institution, such as an issuing bank or issuer 114 (and its associated computers), issues a payment account, such as a credit card account or a debit card account, to the cardholder 102, who uses the payment account (or payment card associated with the payment account) to tender payment for a purchase from the merchant 108. To accept payment from the cardholder 102, the merchant 108 must normally establish an account with a financial institution that is part of the system 100. This financial institution is usually called a "merchant bank," an "acquiring bank," or simply an "acquirer," represented by reference character 116.

The POS terminal 110, the acquirer computers 116, the payment network 112, and the issuer computers 114 may be coupled in communication via a communications network 124. The network 124 may include, for example and without limitation, one or more of a local area network (LAN), a wide area network (WAN) (e.g., the Internet, etc.), a mobile network, a virtual network, and/or any other suitable public and/or private network capable of facilitating communication among the POS terminal 110, the acquirer computers 116, the payment network 112, and/or the issuer computers 114. In some embodiments, the network 124 may include more than one type of network, such as a private payment transaction network provided by the payment network 112 to the acquirer computers 116 and the issuer computers 114, and, separately, the public Internet, which may facilitate communication between the POS terminal 110 (or merchant 108), the payment network 112, the acquirer computers 116, the issuer computers 114, and the cardholder 102, etc.

The payment processing system 100 may be configured to process authorization messages, such as ISO® 8583 compliant messages and ISO® 20022 compliant messages. (ISO is a registered trademark of the International Organization for Standardization of Geneva, Switzerland.) As used herein, ISO refers to a series of standards approved by the International Organization for Standardization. ISO 8583 compliant messages are defined by the ISO 8583 standard, which governs financial transaction card-originated messages and further defines acceptable message types, data elements, and code values associated with such financial transaction card originated messages. ISO 8583 compliant messages include a plurality of specified locations for data elements. ISO 20022 compliant messages are defined by the ISO 20022 standard. ISO 20022 compliant messages may include acquirer to issuer card messages (ATICA).

In a typical transaction, when the cardholder 102 tenders payment for a purchase (e.g., with a payment card, virtual card, digital wallet, etc.), the merchant 108 requests authorization via the acquirer 116 (and its associated computers) for the amount of the purchase.

In some embodiments, the payment card transaction is a card present transaction conducted, for example, where the cardholder 102 swipes or dips a payment card at the merchant's point-of-sale (POS) terminal 110. Accordingly, the request is oftentimes performed through the use of the POS terminal 110. The POS terminal 110 reads the cardholder's account information from the payment card or digital wallet and communicates electronically with the transaction processing computers of the acquirer 116. Alternatively, the acquirer 116 may authorize a third party to perform transaction processing on its behalf. In such a case, the POS terminal 110 may be configured to communicate with the third party. Such a third party is usually called a "merchant processor" or an "acquiring processor."

Figure 2:
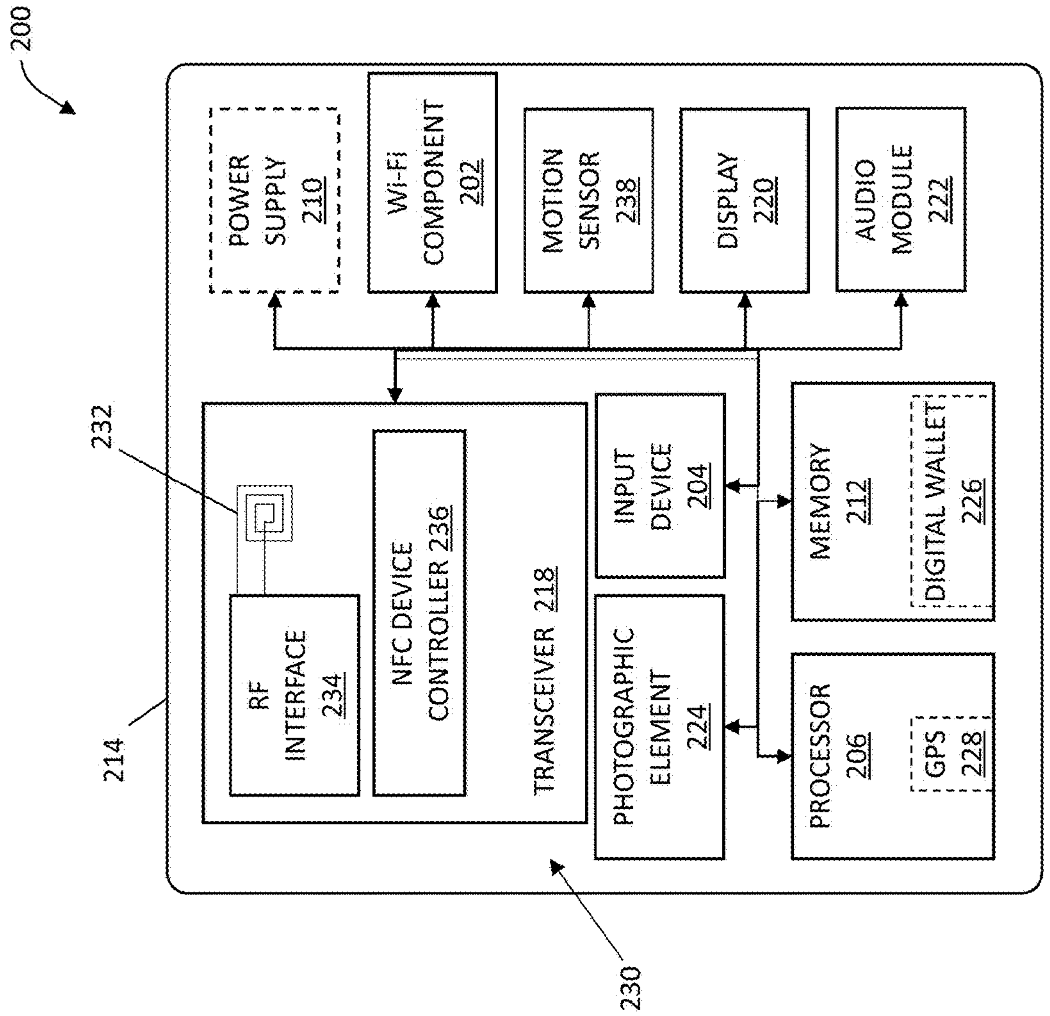
FIG. 2 is a schematic diagram illustrating an exemplary cardholder computing device for the system shown in FIG. 1.

Alternatively, the payment card transaction may be a card-not-present transaction conducted, for example, with a payment card stored on file with the merchant or stored as digital wallet data in a digital wallet 226 (FIG. 2) on a consumer's computing device 104 (or 200 of FIG. 2). The device 104 may be, for example, a cellular telephone (e.g., smartphone), a smart watch or other electronic wearable apparel, a tablet, an implanted smart device, a personal computing device, or any other electronic device capable of two-way digital communications which may be associated with a cardholder.

Using a payment network 112 (or payment processor), computers of the acquirer 116 or the merchant processor will communicate with computers of the issuing bank or issuer 114 to determine whether the cardholder's account is in good standing and whether the purchase amount is covered by the cardholder's available credit line or account balance. Based on these determinations, the request for authorization will be declined or accepted. If the request is accepted, the transaction is given a bank network reference number, such as the Banknet Reference Number, an authorization code, and/or other transaction identifiers that may be used to identify the transaction.

In one or more embodiments, a putative payment transaction may receive pre-authorization. Pre-authorizations, also known as authorization holds, are temporary holds that a merchant 108 may place on a customer's 102 account to ensure there are enough funds to cover a future transaction. The pre-authorization amount is deducted from the cardholder's 102 available balance, but does not comprise an actual charge, and the cardholder's 102 account balance does not decrease until the transaction itself is processed (which may or may not occur). The merchant 108 may receive an approval code resulting from the issuer's 114 approval of the pre-authorization request.

Often, the cardholder 102 does not see the pre-authorized transaction in online records, but the corresponding account's available balance decreases by the pre-authorization amount. When the transaction is finalized, the pre-authorization is lifted and the cardholder 102 is charged the final purchase amount.

The pre-authorization may have a sunset, which may be measured in days, such as where a merchant 108 has up to seven (7) days to process a "capture" to collect the pre-authorized funds in connection with a completed transaction. In such an example, the pre-authorized funds may no longer be available after the seven (7) day period expires. The actual duration of the hold may depend on the merchant classification code (MCC code) of the merchant 108.

If the cardholder 102 does not have enough funds to complete the transaction, the payment will be declined at close-out. If the cardholder 102 does not have enough funds for the pre-authorization, the transaction should be declined, for example, immediately.

After a request for authorization is accepted and/or a merchant 108 captures a pre-authorized transaction, the available credit line or available account balance of cardholder's account is decreased. Normally, a charge is not posted immediately to a cardholder's account because bankcard associations, such as Mastercard, have promulgated rules that do not allow a merchant to charge, or "capture," a transaction until the purchased goods are shipped or services are delivered. When the merchant 108 ships or delivers the goods or services, the merchant 108 captures the transaction by, for example, appropriate data entry procedures on the POS terminal 110. If the cardholder 102 cancels a transaction before it is captured, a "void" is generated. If the cardholder 102 returns goods after the transaction has been captured, a "credit" is generated. The payment network 112 may store the transaction information, such as, and without limitation, a type of merchant, a merchant identifier, a location where the transaction was completed, an amount of purchase, and a date and time of the transaction, in a transaction database, such as the transaction database 120.

During the corresponding authorization process of the payment processing system 100, a clearing process is also taking place. During the clearing process, the acquirer 116 provides issuing bank 114 with information relating to the purchase. No money is exchanged during clearing. Clearing (also referred to as "first presentment") involves the exchange of data required to identify the cardholder's account, such as the account number, expiration date, billing address, amount of the sale, and/or other transaction identifiers that may be used to identify the transaction. Along with this data, banks in the United States also include a bank network reference number, such as the Banknet Reference Number, which identifies that specific transaction. When the issuing bank 114 receives this data, it posts the amount of sale as a draw against the available credit in the cardholder account and prepares to send payment to the acquirer 116.

After a transaction is authorized and cleared, the transaction is settled between the merchant 108, the acquirer 116, and the issuing bank 114. Settlement refers to the transfer of financial data or funds between the merchant's account, the acquirer 116, and issuing bank 114 related to the transaction. Usually, transactions are captured and accumulated into a "batch," which is settled as a group.

Following settlement, a cardholder 102 may, through its issuing bank 114, initiate a chargeback case to dispute validity of a transaction, aspects of the goods/services received thereunder, and/or accuracy of data from the cardholder's 102 account, the purchase and/or the authorization and clearing process. Following initiation of the chargeback, a workflow is initiated to resolve the dispute and determine financial liability. Chargebacks may more particularly involve any one or more of: fraud, authorization problems, point-of-interaction errors, and/or cardholder disputes.

Alternatively, either the cardholder 102 (through its issuing bank 114) or the acquirer 116 may initiate a compliance case to dispute the transaction where a chargeback does not exist, a payment processing network 112 rule or standard has been violated, and/or a financial loss is documented as a result of the rule or standard violation.

In any event, resolution of the dispute and determination of financial liability may include manual calculations and consideration of historical transaction behavior of the cardholder 102, merchant 108, acquirer 116, and/or the like. In one or more embodiments of the present invention, the historical transaction data of the involved parties, data regarding the transaction in dispute, and data regarding third party transactions (e.g., labeled in previously-resolved disputes of the type at issue) may be used to automatically render recommendations for resolving chargeback and/or compliance disputes, as described in more detail below.

The transactions described above are referred to herein as "monetary transactions."

Exemplary Computer Systems

FIG. 2 is an example configuration of a user computing system 200, such as the consumer computing device 104 (shown in FIG. 1) that may be operated by a user, such as the cardholder 102 (shown in FIG. 1). In the exemplary embodiment, the computing system 200 may be a computing device configured to connect wirelessly to one or more of the merchant 108, the POS terminal 110, the network 124, and any other computing devices associated with the system 100.

In the exemplary embodiment, the computing system 200 may generally include a processor 206, a memory device 212, a transceiver 218 (or a wireless communication device), and a photographic element 224. In addition, the computing system 200 may include an integrated Wi-Fi component 202 (e.g., implementing the Institute of Electrical and Electronics/IEEE 802.11 family of standards), an input device 204, a display 220, and an audio module 222. Moreover, the computing system 200 optionally may include an internal power supply 210 (e.g., a battery or other self-contained power source) to receive power. Optionally, the computing system 200 may include a motion sensor 238.

The processor 206 may include one or more processing units (e.g., in a multi-core configuration) specially programmed for executing computer readable instructions. The processing units may be digital processing units. The instructions may be executed within a variety of different operating systems (OS) on the computing system 200, such as operating systems sold under one or more of the following marks as of the initial filing date of the present disclosure: UNIX® (a registered trademark of THE OPEN GROUP LIMITED (PRIVATE LIMITED BY SHARES; ENGLAND AND WALES, UNITED KINGDOM)), LINUX® (a registered trademark of TORVALDS, LINUS (INDIVIDUAL; USA)), MICROSOFT WINDOWS® (a registered trademark of Microsoft Corporation (CORPORATION; WASHINGTON, USA)), or the like. More specifically, the instructions may cause various data manipulations on data stored in the memory device 212 (e.g., create, read, write, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 212 may be any device allowing information such as payment card data, the executable instructions, and/or other data to be stored and retrieved. The memory device 212 may include one or more computer readable media.

In the example embodiment, the processor 206 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 200 may be widely deployed, it may be impractical to manually update software for each computing system 200. Therefore, the system 100 may provide a mechanism for automatically updating the software on the computing system 200. For example, an updating mechanism may be used to automatically update any number of components and their drivers, both network and non-network components, including system level (OS) software components. In some embodiments, the components of the computing system 200 may be dynamically loadable and unloadable; thus, they may be replaced in operation without having to reboot the OS.

A location of the computing system 200 may be obtained through conventional methods, such as a location service (e.g., global positioning system (GPS) service) in the computing system 200, “ping” data that includes geotemporal data, from cell location register information held by a telecommunications provider to which the computing system 200 may be connected, and the like. For example, in one suitable embodiment, a GPS chip 228 may be part of or separate from the processor 206 to enable the location (or geolocation) of the computing system 200 to be determined.

The Wi-Fi component 202 (broadly, a communication interface) may be communicatively connectable to a remote device such as the merchant computer or POS terminal 110 and the network 124. The Wi-Fi component 202 may include, for example, a wireless or wired network adapter or a wireless data transceiver for use with Wi-Fi (e.g., implementing the Institute of Electrical and Electronics/IEEE 802.11 family of standards), Bluetooth communication, radio frequency (RF) communication, near-field communication (NFC), and/or with a mobile phone network, Global System for Mobile communications (GSM), 5G, or other mobile data network, and/or Worldwide Interoperability for Microwave Access (WiMax) and the like.

Stored in the memory device 212 may be, for example, computer readable instructions for providing a user interface to the user, such as the cardholder 102, via the display 220 and, optionally, receiving and processing input from the input device 204. A user interface may include, among other possibilities, a web browser, a client application, a digital wallet application 226, and the like. Web browsers may enable users, such as the cardholder 102, to view and interact with media and other information typically embedded on a web page or a website. A digital wallet 226 may allow the cardholder 102 to receive, generate, and/or store payment credentials, such as tokens associated with a payment card and/or a virtual payment credential. The digital wallet application 226 (broadly, a digital wallet), is linked to a digital wallet service and/or installed on the user computing system 200. It is contemplated that more than one digital wallet may be associated with the user computing system 200 and accessible by the user interface, where each digital wallet is associated with at least one financial institution (such as the issuer 114).

The photographic element 224 may include a camera or other optical sensor and lens combination capable of generating a video signal and capturing an image, iris scan, and the like. In various embodiments, the photographic element 224 may be integrated in a housing or body, such as a housing 214, of the computing system 200. When the photographic element 224 captures an image or otherwise generates image data (e.g., video data), the photographic element 224 may store the image data in a data file, either in a raw or compressed format, in the memory device 212.

In some embodiments, the motion sensor 238 may include one or more sensor elements that facilitate detecting a person’s presence. For example, the motion sensor 238 may detect when the cardholder 102 moves or raises the user consumer system 200. Upon detection of such motion, the photographic element 224 may begin capturing images (e.g., still or video images), the transceiver 218 may be activated, and/or the audio module 222 may begin capturing audio. The motion sensor 238 may be operatively coupled to the photographic element 224 such that the consumer’s presence may be detected by detecting motion using the photographic element 224. The motion sensor 238 may include, for example, and without limitation, sensor elements such as a passive infrared sensor, an ambient light sensor, and the like.

In the example embodiment, the display 220 may include, for example, and without limitation, a liquid crystal display (LCD), an organic light emitting diode (OLED) display, or an “electronic ink” display. In some embodiments, a single component such as a touch screen may function as both an output device (e.g., the display 220) and the input device 204. As such, the display 220 may optionally include a touch controller for support of touch capability. In such embodiments, the computing system 200 may detect the presence of the cardholder 102, for example, by detecting that the cardholder 102 has touched the display 220 of the computing system 200.

The audio module 222 may include, for example, and without limitation, a speaker and related components capable of broadcasting streaming and/or recorded audio and may also include a microphone. The microphone facilitates capturing audio through the computing system 200.

In the example embodiment, the computing system 200 includes the housing 214 at least partly (and more preferably, at least substantially or entirely) enclosing the components described above. In addition, the computing system 200 includes circuitry 230 configured to communicate with the network 124 (shown in FIG. 1) and/or other computing devices (e.g., other mobile devices, the computers, devices, or systems 106, 110, 112, 114, 116, etc.). The circuitry 230 may include, for example, leads, connectors, NFC-enabled circuitry, Wi-Fi-enabled circuitry, and photographic element circuitry.

In one or more embodiments, the transceiver 218 may include an antenna 232. The antenna 232 includes a looped wire configured to transmit radio signals when current flows through the looped wire. The antenna 232 is any size, shape, and configuration that is suitable for transmitting signals as described herein. For example, the antenna 232 may be a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 232 generates a magnetic field when it vibrates at a selected frequency. Specifically, the antenna 232 may be configured to vibrate at a frequency of about 13.56 MHz, which is suitable for use in a near field communication (NFC) system.

In the example embodiment, the antenna 232 may transmit radio signals to and may receive radio signals from other wireless-enabled computing devices, for example, another mobile device, the computers, devices, or systems 106, 110, 112, 114, and 116, and/or any other components used in wireless systems. In NFC systems, for example, at least one NFC component generates a magnetic field to inductively transfer currents and, thereby, exchange signals and information with other NFC components positioned within the magnetic field. In one example embodiment, the antenna 232 may function as an NFC component to send and receive signals. The antenna 232 may be configured to transmit radio signals to NFC components positioned within the magnetic field of the antenna 232, such as when the computing system 200 is positioned within a predetermined distance of the merchant computer or POS terminal 110. Therefore, the magnetic field generated by the antenna 232 may define the active range of the computing system 200. Additionally, the antenna 232 may receive radio signals from NFC components when the antenna 232 is positioned within the magnetic field of the NFC components.

The transceiver 218 also may include a radio frequency (RF) interface 234 and an NFC device controller 236. The RF interface 234 and the NFC device controller 236 may be powered by the internal power supply 210 and/or the display 220. In addition, the processor 206 and the memory device 212 may be powered in the same manner. The RF interface 234 may be configured to receive and transmit RF signals through the antenna 232. The NFC device controller 236 may be configured to process the received RF signals and to generate signals to be transmitted by the RF interface 234. The memory device 212 may be configured to store data associated with transmitting and receiving the RF signals. The NFC device controller 236 may be coupled in communication with the processor 206.

In some embodiments, the computing system 200 may be connected to one or more peripheral devices (not shown). That is, the computing system 200 may communicate various data with one or more peripheral devices. For example, the computing system 200 may communicate with one or more peripheral devices through the Wi-Fi component 202, the transceiver 218, or other suitable means.

Figure 3:
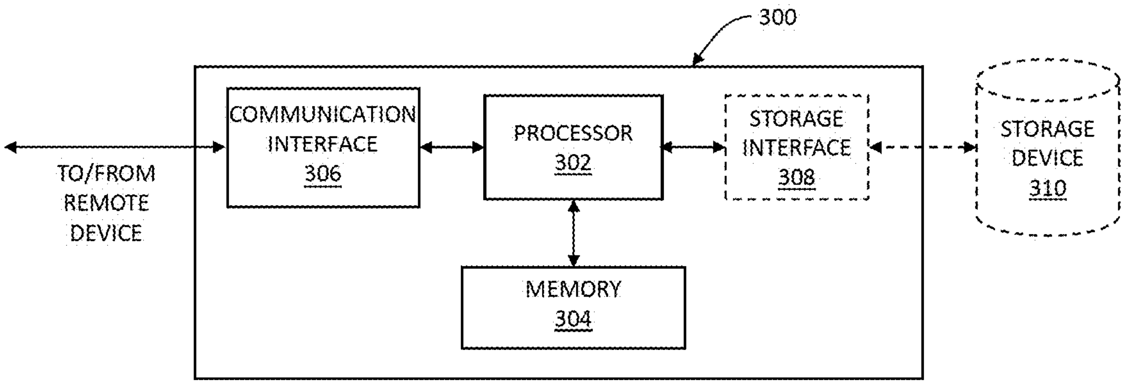
FIG. 3 is a schematic diagram illustrating an exemplary computing system for the system shown in FIG. 1.

FIG. 3 is an example configuration of a computing system 300. In an embodiment, the computing system 300 may include, but not be limited to, the merchant computer or POS terminal 110, the acquirer computer 116, a payment processor computer 118, and/or the issuer computer 114 (all shown in FIG. 1). In the example embodiment, the computing system 300 may include a processor 302 for executing instructions. The instructions may be stored in a memory 304, for example. The processor 302 may include one or more processing units (e.g., in a multi-core configuration) for executing the instructions. The processing units may be digital processing units.

The instructions may be executed within a variety of different operating systems on the computing system 300, such as operating systems sold under one or more of the following marks as of the initial filing date of the present disclosure: UNIX® (a registered trademark of THE OPEN GROUP LIMITED (PRIVATE LIMITED BY SHARES; ENGLAND AND WALES, UNITED KINGDOM)), LINUX® (a registered trademark of TORVALDS, LINUS (INDIVIDUAL; USA)), MICROSOFT WINDOWS® (a registered trademark of Microsoft Corporation (CORPORATION; WASHINGTON, USA)), or the like. More specifically, the instructions may cause various data manipulations on data stored in a storage device 310 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 302 may be operatively coupled to a communication interface 306 such that the computing system 300 can communicate with a remote device such as a user computing system 200 (shown in FIG. 2), one or more of the computers, devices, or systems 104, 106, 110, 112, 114, and 116, and/or another server system. For example, the communication interface 306 may receive communications from a consumer computing device 104 via the Internet (FIG. 1).

The processor 302 may be operatively coupled to the storage device 310. The storage device 310 may be any computer-operated hardware suitable for storing and/or retrieving data. In some embodiments, the storage device 310 may be integrated in the computing system 300. In other embodiments, the storage device 310 may be external to the computing system 300. The storage device may be similar to, and may perform the functions of, embodiments of the database 120 (shown in FIG. 1). For example, the computing system 300 may include one or more hard disk drives as the storage device 310. In other embodiments, the storage device 310 may be external to the computing system 300 and may be accessed by a plurality of server systems 300. For example, the storage device 310 may include multiple storage units such as hard disks or solid-state disks in a redundant array of inexpensive disks (RAID) configuration. The storage device 310 may include a storage area network (SAN) and/or a network attached storage (NAS) system.

In some embodiments, the processor 302 may be operatively coupled to the storage device 310 via a storage interface 308. The storage interface 308 may be any component capable of providing the processor 302 with access to the storage device 310. The storage interface 308 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 302 with access to the storage device 310.

In one or more embodiments, the storage interface 308 receives and processes database queries from a first ML model to access one or more account behavior descriptions (e.g., in the form of pre-calculated, n-dimensional vectors) from the storage device 310, as discussed in more detail below.

The memory 304 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Exemplary Computer-Implemented Methods

Figure 4:
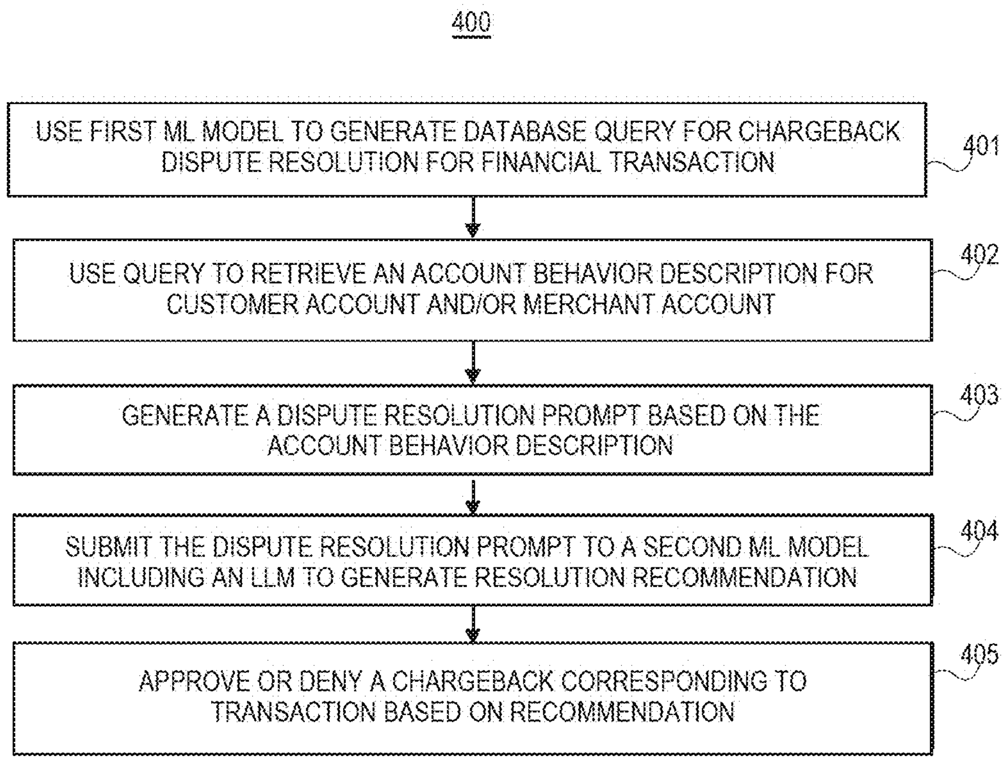
FIG. 4 is a flowchart illustrating an exemplary computer-implemented method for financial chargeback dispute resolution, in accordance with embodiments of the present disclosure.

FIG. 4 is a flowchart illustrating an exemplary computer-implemented method 400 for financial chargeback dispute resolution. The operations described herein may be performed in the order shown in FIG. 4 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 400 is described below, for ease of reference, as being executed by exemplary devices and components introduced with the embodiments illustrated in FIGS. 1-3. In one or more embodiments, and unless otherwise stated below, the computer-implemented method 400 is implemented by the payment processor computer 118 and/or issuer computer 114. However, while operations within the computer-implemented method 400 are described below with reference to the payment processor computer 118 and/or issuer 114 computer, according to some aspects of the present invention, the computer-implemented method 400 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 401, a first machine learning (ML) model may generate a database query for chargeback dispute resolution for a financial transaction. The dispute may be between a cardholder having a cardholder or customer account and a merchant having a merchant account.

In one or more embodiments, the database query is generated based on or in response to a request for a chargeback or compliance case. For example, where such a case has been initiated by a cardholder or acquirer, the responsible or related computing device (for example, a payment processor computer and/or issuer computer) may automatically or with manual input or initiation generate the database query.

The database to be queried may be, for example, a database containing vectors representative of historical transaction data and/or patterns or correlations observed or derived from such historical transaction data. Where, as in the example method 400, the query relates to resolution of a dispute over which party to a financial transaction should ultimately be awarded the amount at issue in the transaction, the vectors of the vector database may be generated and/or stored in alignment with the goal of supporting speedy and accurate chargeback dispute resolution by a recommendation large language model (LLM), discussed in more detail below.

For example, chargeback dispute resolution may lean heavily on a number of factors evident from review of, or which may be derived mathematically and/or logically from, historical transaction data for a plurality of cardholders. Historical transaction records—such as those held by a payment network—may be utilized to generate the vectors for the vector database. The vectors may be labeled—for example, where a corresponding transaction or account is/are known to have been the subject of an unfavorable chargeback dispute resolution—or they may be unlabeled. If unlabeled, such vectors may nonetheless have been previously found to encode data useful in determining which party to a financial transaction under dispute is entitled to the funds.

In one or more embodiments, the vectors or vector embeddings stored in the database are pre-calculated n-dimensional vectors prepared in advance for retrieval in response to queries. For example, and as discussed above, the database vectors may encode or embody past transactions and/or cardholder accounts associated with favorable or unfavorable chargeback dispute resolutions, as the case may be. For another example, the database vectors may be more indirectly useful in deciding a chargeback dispute—such as where the vectors encode or embody past transactions and/or cardholder accounts exhibiting certain relevant behaviors, such as fraudulent behaviors, frequent chargeback dispute participation, extreme and irregular account balance and/or payment changes, or other relevant datapoints and/or patterns.

In a preferred embodiment, the vectors are generated and pre-configured by an LLM so that each represents account data for an individual and/or an individual account in a format and encoding that is most useful for submission as part of a prompt to the recommendation LLM. For example, a computing device of the payment network may train and/or fine-tune a vector database LLM on labeled and/or unlabeled historical transaction data across a plurality of accounts and account holders for determining likelihood of fraudulent or frivolous transactional activity or more directly on chargeback dispute success. The fine-tuning may enable the vector database LLM to adjust its weightings and structure to produce vectors respectively corresponding to individual accounts which—when converted from token embeddings to natural language and submitted to a recommendation LLM as part of a natural language prompt—provide swift and high accuracy recommendations for resolving chargeback disputes. The fine-tuned vector database LLM may periodically pull data from the payment network database (and/or issuer database(s)) for each account and/or accountholder, and may generate and store vectors regarding each for later use in chargeback dispute resolution processes described herein. The pre-calculated vectors may comprise the account behavior description(s) discussed in more detail below.

The query at operation 401 may accordingly be generated for submission to the vector database or supporting search/matching programs for identification and retrieval of the most relevant or best matching vector(s). The query may include details of the transaction in dispute, of the parties to the transaction, and/or of the accounts relating to the transaction.

In one or more embodiments, commercially available tools such as those offered under the OPENAI® API EMBEDDINGS registered trademark (as of the initial filing date of the present disclosure) of OpenAI, Inc., or other LLM or machine learning tools may be used to generate the query or vector embeddings representing the query within the scope of the present invention. Further, semantic searching and/or a semantic search layer may be used to construct the query and/or populate the vector database from raw historical transaction data.

Referring to operation 402, the query may be used to retrieve an account behavior description for a customer account and/or merchant account involved in the chargeback dispute. For example, the account behavior description may comprise vector(s) from the database found to be closest to the vector query submitted to the database. In one or more embodiments, proximity to the query may be determined based on distance metrics such as L2 or Euclidean distance, cosine, and/or internal product. In one or more embodiments, a vector database search LLM and/or semantic searching may be used to search the vector database and locate the vector(s) comprising the account behavior description. For example, a payment network and/or issuer computing device may automatically or using manual input construct the query using information about the transaction, the cardholder and/or the merchant in question, and the vector database search LLM may convert the query to token embeddings for determination of the closest match (e.g., lowest distance) within the vector database.

As discussed above, in one or more embodiments, the account behavior description may comprise one or more vectors of the vector database derived from historical transaction data of one or more third party transaction(s) and/or the cardholder (customer) or merchant account(s). In one or more embodiments, the account behavior description may be a vector defining aspects of the transaction, and one or both of the account(s) and/or accountholder(s) in dispute, for example encoding historical or current data dimensions, factors and datapoints suspected to be most relevant or useful to the recommendation LLM in resolving the dispute.

The account behavior description may include one or more pre-calculated vector(s) encoding aspects or a description of previous financial transactions involving the customer account, the merchant account, or both. Further, such vector(s) may describe previous chargeback events involving the customer account, the merchant account, or both. In one or more embodiments, the vector(s) may summarize multiple such events, such as by including or reflecting a sum or number of chargeback transaction events involving the customer account, the merchant account, or both. The chargeback events may be of any of the following types: first chargebacks, pre-arbitration cases, arbitration cases, second presentments, pre-compliance cases, compliance cases, and fee collection cases.

As discussed above, the vectors of the vector database may be generated and/or revised over time and/or using machine learning (e.g., through labeled or supervised training of the vector database LLM) so that the vectors can be converted to natural language and used to populate prompts to support quick, efficient and accurate chargeback dispute resolution by the recommendation LLM.

Referring to operation 403, a dispute resolution prompt may be generated based on the account behavior description. In one or more embodiments, the prompt will be generated as a natural language narrative, for example including data about the transaction under dispute, the parties to the transaction, and the retrieved account behavior description(s), in each case forming a natural language prompt asking for a recommendation from the recommendation LLM regarding which of the payor (i.e., cardholder or customer) and payee (i.e., merchant) should be awarded the amount of the transaction in dispute. Generation of the prompt may be automated, for example where natural language processing rules and/or templates are configured for the dispute resolution prompts to include the relevant data about the transaction under dispute, the parties to the transaction, and the retrieved account behavior description(s). As will be appreciated, the account behavior description may be automatically converted from token embeddings to natural language for inclusion in the prompt.

Referring to operation 404, the dispute resolution prompt may be submitted to a second ML model including the recommendation LLM to generate a resolution recommendation.

In one or more embodiments, the recommendation LLM is preliminarily fine-tuned for chargeback dispute resolution based on financial data. For example, the recommendation LLM may be fine-tuned to recognize patterns in transactional data, personally identifiable data, personal life event data, or other data which may be included in dispute resolution prompts which increase or decrease the likelihood that a given cardholder or merchant is entitled to the funds in dispute. Preliminary fine-tuning may also/alternatively acclimate the recommendation LLM to one or more languages encountered in the prompt(s), and/or to unique data formats, syntaxes and contents encountered within the financial data context for which it is configured.

The prompt may be configured and engineered to optimize the quality of the output. For example, the prompt may include a significant number of relevant examples relevant to the query it embodies (e.g., for single shot or multi-shot learning)—for example where account behavior description vectors encode data regarding third party transactions labeled as having been resolved for or against a cardholder—and may include a plurality of financial account records or other data types, in each case to provide context to activate the recommendation LLM toward the most likely relevant learned relationships it embodies.

The output includes one or more datums responsive to the query of the prompt. For example, where the prompt seeks a recommendation for which of a cardholder and a merchant are entitled to the funds in dispute, the output may be the resolution recommendation including the requested conclusion. The output may be a natural language narrative including and explaining the recommendation.

In one or more embodiments, the output also includes an explanation generated by the recommendation LLM for which learned pattern(s) and/or aspects were most influential in reaching the resolution recommendation. The output may include an indicator of a degree of confidence—for example, expressed as a percentage or on a standardized scale—in its resolution. For example, where the cardholder is very likely involved in fraud in the present transaction or in its historical transactions, the recommendation LLM may generate its output resolution in favor of the merchant with a high degree of confidence. For another example, where the dominant aspects of a prompt or transaction relied on in reaching the recommendation derive from factors having a relatively low correlation, the recommendation LLM may output its resolution in favor of either party with a relatively low degree of confidence.

Referring to operation 405, the chargeback dispute may be resolved based on the resolution recommendation through approval or denial of the chargeback. In one or more embodiments, the payment network will advise the issuer with the, or the issuer will act on its own, resolution recommendation. For example, where the resolution recommendation favors the cardholder, the funds in dispute may be refunded to the cardholder. In contrast, where the resolution recommendation favors the merchant, the processed transaction may be allowed to stand. The approval or denial may be automated.

In one or more embodiments, the approval or denial may be contingent on manual review. For example, low confidence indicators (e.g., below a pre-defined threshold) and/or the presence of certain categories of dominant reasons described in the recommendation LLM output, may trigger manual review rather than automated approval or denial. A confidence indicator falling below a certain percentage, or significant reliance on a fact pattern known to have a high false positive (or negative) identification, may trigger such manual review.

Figure 5:
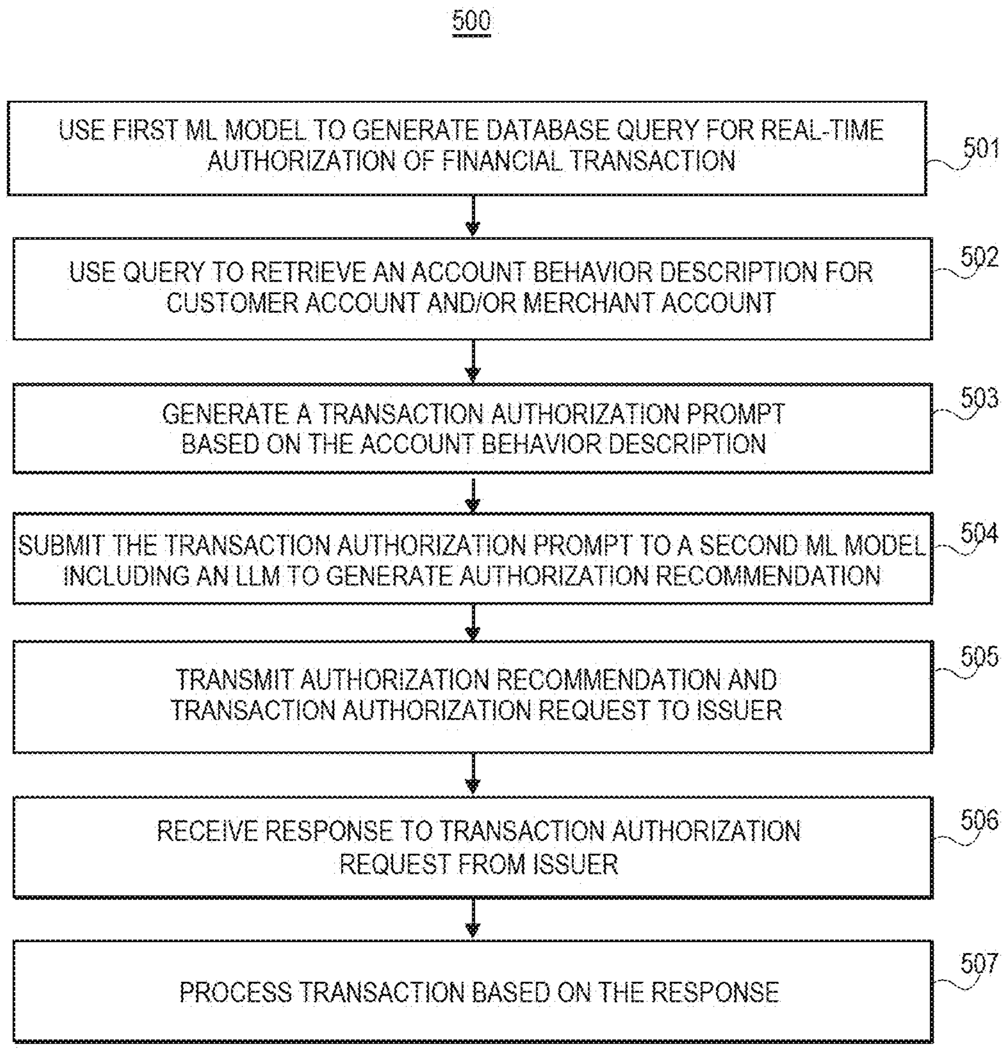
FIG. 5 is a flowchart illustrating an exemplary computer-implemented method for transaction authorization, in accordance with embodiments of the present disclosure.

FIG. 5 is a flowchart illustrating an exemplary computer-implemented method 500 for transaction authorization. The operations described herein may be performed in the order shown in FIG. 5 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 500 is described below, for ease of reference, as being executed by exemplary devices and components introduced with the embodiments illustrated in FIGS. 1-3. In one or more embodiments, and unless otherwise stated below, the computer-implemented method 500 is implemented by the multi-party payment processing system 100. However, while operations within the computer-implemented method 500 are described below with reference to the multi-party payment processing system 100, according to some aspects of the present invention, the computer-implemented method 500 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 501, a first machine learning (ML) model may generate a database query for real-time authorization of a financial transaction. In one or more embodiments, the database query is generated based on or in response to a pre-authorization request of a merchant. Also or alternatively, the database query may be generated based on or in response to a message received from, or to a message derived from a message received from, a cardholder device (e.g., device 104). For example, the message from a cardholder device may comprise submission of a transaction at a merchant point of sale. The transaction may be initiated via selection of a cardholder card or account within a digital wallet application executed on the cardholder device.

In one or more embodiments, the cardholder device may include or interface with a program and/or algorithm for proposing and/or initiating pre-authorization events based on pattern recognition. In one or more embodiments, the pattern recognition relies on time and date information, as well as prior purchase or transaction history data. In one or more embodiments, the pattern recognition algorithm also or alternatively relies on other data, such as data regarding the location of the cardholder device, movement of the cardholder device, authentication data for the cardholder gathered by the cardholder device and/or other cardholder devices (such as keystroke patterns, voice or speech patterns, movement patterns, associated devices or device usage patterns, and/or other data types), and other data. The pattern recognition program and/or algorithm may use these various data as a set to predict future purchases the cardholder is likely to attempt, and to preemptively seek or initiate pre-authorization for such transactions.

Accordingly, a preliminary operation of embodiments of the present invention may include executing the pattern recognition program and/or algorithm to recognize purchase or transaction patterns. It is foreseen that machine learning methods may be used to support learning by the program in connection with correlating data to transactions and/or merchants. The machine learning techniques or programs may include curve fitting, regression model builders, convolutional or deep learning neural networks, combined deep learning, pattern recognition, or the like. Based upon this data analysis, the machine learning program(s) may learn method(s) for correlating the various types of available data to particularized transactions and/or merchant(s).

It should be noted that, in supervised machine learning, the machine learning program may be provided with example inputs (i.e., input data of one or more of the various types outlined above) and their associated outputs (i.e., labels for particular transactions and merchants), and may seek to discover general rule(s) or correlation(s) that map inputs to outputs.

The labeling system may utilize classification algorithms such as Bayesian classifiers and decision trees, sets of pre-determined rules, and/or other algorithms. For example, the pattern recognition or machine learning program may include a deep neural network (DNN). The method may include supervised training of the DNN using the cardholder and cardholder device data, organized and labeled with associations with particular historical transactions of the cardholder, so that the DNN is trained to correlate all or some of the data with transactions and, in some cases, with particular merchants and/or locations. For another example, the pattern recognition program may also or alternatively include unsupervised training, such as by clustering. Such clusters may group transaction data by merchants, merchant types, and/or locations, without departing from the spirit of the present invention.

It should be noted that training the pattern recognition program and/or algorithm may be performed wholly or partly on historical transaction data of the individual cardholder, and/or wholly or partly on historical transaction data of third parties. Patterns or correlations between some data types and transactions and/or merchants may transcend the individual and be applicable or informative to the cardholder's individual behaviors and habits even if derived from third party transaction data.

Returning to discussion of operation 501, wherever the database query is triggered by receipt of a message relating to a transaction pre-authorization, the trained pattern recognition program and/or machine learning algorithm may be the source and/or propagator of such message(s). For example, where the cardholder device or associated device receives data indicating the cardholder (or device) is in a given location or moving in a movement pattern, that the time and/or day are within certain parameters, that one or more correlated transactions have occurred, or the like, or any combination of any of the foregoing, alone or together comprising data of the types described herein, the machine learning algorithm may determine based on its learned patterns and correlations that there is a sufficient likelihood of a transaction occurring, for example at a particular merchant and/or merchant type within a location range (i.e., a "putative transaction").

The cardholder device or an associated device may transmit a message seeking or initiating pre-authorization for the putative transaction. The message may include or comprise the transaction authorization request, which may be automatically generated (e.g., by a payment application of the cardholder device). For example, the cardholder device may determine based on a known geolocation pattern for the device that it is likely the cardholder will soon seek to fill up a vehicle with gas at a particular fuel dispenser or gas station based on such data. For another example, the cardholder device or an associated device may determine that it is likely the cardholder will soon shop for groceries at a particular convenience or grocery store based on such data. In each case, the cardholder device may transmit a corresponding message seeking or initiating pre-authorization processes for such a transaction.

It is also foreseen that the cardholder device or associated device generating or interpreting output of the machine learning model may include in the message expected limitations or aspects of the putative transaction which, if deviated from, would cause the output of the model to change. Put differently, if certain factors in the model input data—such as time, transaction amount, or the like—were to change by a sufficient amount, the prediction or classification output for the model would likewise change (for example, the circumstances may become insufficient to meet an acceptable prediction likelihood threshold thereby triggering a pre-authorization process). Such ranges representing how much circumstances may change while retaining the model's prediction for the putative transaction based on its learned correlations and patterns may be translated into limitations on any pre-authorization that may result from methods of embodiments of the present invention. For example, the predicted putative transaction may need to occur within the subsequent 1.5 hours to fall within an acceptable prediction likelihood threshold for the model, the predicted putative transaction may need to fall below a maximum amount to be within the acceptable prediction likelihood threshold for the model, and so on and so forth. These ranges may be converted to pre-authorization limits, such as, using the examples outlined above, where a pre-authorization expires after 1.5 hours or is limited to the maximum amount.

Returning more fully to discussion of operation 501, the database query for real-time authorization of a financial transaction may be for a pre-authorization, and may be generated based on a message from the cardholder device and/or merchant. The message may fully describe the pre-authorization request, or may simply include one or more datums relating to the cardholder device. For example, in one or more embodiments, the message may merely indicate a circumstance or fact relating to the cardholder device or cardholder—such as where a status or location of the cardholder or an associated vehicle or device is transmitted—or it may more fully describe the anticipated putative transaction. Where a simple triggering datum comprises the message, the fuller context, contents of the transaction authorization request, and need for pre-authorization may be derived, generated or calculated by the merchant and/or a payment network (servers of which may be considered the "associated device" of the cardholder according to some embodiments), and examples are described in more detail below.

The database to be queried may be, for example, a database containing vectors representative of historical transaction data and/or patterns or correlations observed or derived from such historical transaction data. Where, as in embodiments of the example method 500, the query relates to whether a pre-authorization and any related limitations are appropriate and/or should be recommended to an issuer, the vectors of the vector database may be generated and/or stored in alignment with the goal of supporting efficient transaction authorization and/or pre-authorization, reducing fraud, improving identification of circumstances in which pre-authorization is desired and appropriate, and identifying and applying reasonable limitations to pre-authorization. In one or more embodiments, the vectors of the vector database may also be configured for submission to a recommendation large language model (LLM). Further, it is foreseen that the vectors may be configured for inclusion in chain-of-thought prompting, as contrasted with standard prompting, without departing from the spirit of the present invention.

For example, transaction authorization and/or pre-authorization may lean heavily on a number of factors evident from review of, or which may be derived mathematically and/or logically from, historical transaction data for the individual cardholder. Providing a shorthand explanation of the more detailed discussion above—the recommendation LLM consuming the vectors will seek to determine whether a putative transaction "makes sense" (e.g., comports with typical cardholder behavior or can reasonably be expected to be desired by the cardholder), is legitimate (e.g., non-fraudulent), or the like, as well as to determine acceptable boundaries or limitations for an authorization. However, in one or more embodiments, the vectors will also include or be derived from historical transaction data of a plurality of cardholders, for example where such data reveal patterns or trends applicable to the instant cardholder's behaviors, preferences, legitimacy or the like.

Historical transaction records—such as those held by a payment network—may be utilized to generate the vectors for the vector database. The vectors may be labeled—for example, where a corresponding transaction or cardholder account is/are known to encode a related historical transaction or behavioral pattern—or they may be unlabeled. If unlabeled, such vectors may nonetheless have been previously found to encode data useful in determining whether and to what extent a transaction should be authorized or pre-authorized.

In one or more embodiments, the vectors or vector embeddings stored in the database are pre-calculated n-dimensional vectors prepared for retrieval in response to queries. For example, and as discussed above, the database vectors may encode or embody past transactions and/or cardholder accounts associated with similar legitimate or fraudulent transactions and/or with similar transactions with similar merchants under similar circumstances, as the case may be. For another example, the database vectors may be more indirectly useful in deciding the extent of a pre-authorization—such as where the vectors encode or embody past transactions and/or cardholder accounts exhibiting certain relevant behaviors, such as fraudulent behaviors, movement patterns, seasonal variations in spending patterns, related device (e.g., vehicle) status and/or location patterns, or other relevant datapoints and/or patterns.

In a preferred embodiment, the vectors are pre-configured by an LLM so that each represents account data for an individual and/or an individual account in a format and encoding that is most useful for submission as part of a prompt to the recommendation LLM. For example, a computing device of the payment network may train and/or fine-tune a vector database LLM on labeled and/or unlabeled historical transaction data for the individual cardholder and/or across a plurality of accounts and account holders for determining whether and to what extent to authorize or pre-authorize a transaction. The fine-tuning may enable the vector database LLM to adjust its weightings and structure to produce vectors which—when converted from token embeddings to natural language and submitted to a recommendation LLM as part of a natural language prompt—provide swift and high accuracy recommendations for authorization or pre-authorization. The fine-tuned vector database LLM may periodically pull data from the payment network database (and/or issuer database(s)) for each account and/or accountholder, and may generate and store vectors regarding each for later use in authorization and pre-authorization processes described herein. The pre-calculated vectors may comprise the account behavior description(s) discussed in more detail below.

The query at operation 501 may accordingly be generated for submission to the vector database or supporting search/matching programs for identification and retrieval of the most relevant or best matching vector(s). The query may include details of the cardholder, the cardholder device, historical transaction data of the cardholder, patterns encoded in the pre-calculated vectors for the individual cardholder and/or derived from third party records, associated data discussed in more detail above, and/or other data within the scope of the present invention.

In one or more embodiments, commercially available tools such as those offered under the OPENAI® API EMBEDDINGS registered trademark (as of the initial filing date of the present disclosure) of OpenAI, Inc., or other LLM or machine learning tools may be used to generate the query or vector embeddings representing the query within the scope of the present invention. Further, semantic searching and/or a semantic search layer may be used to construct the query and/or populate the vector database from raw historical transaction data.

Referring to operation 502, the query may be used to retrieve an account behavior description for a customer account and/or merchant account involved in the putative transaction. For example, the account behavior description may comprise vector(s) from the database found to be closest to the vector query submitted to the database. In one or more embodiments, proximity to the query may be determined based on distance metrics such as L2 or Euclidean distance, cosine, and/or internal product. In one or more embodiments, a vector database search LLM and/or semantic searching may be used to search the vector database and locate the vector(s) comprising the account behavior description. For example, a payment network and/or issuer computing device may automatically or using manual input construct the query using information about the putative transaction, the cardholder and/or the merchant in question, and the vector database search LLM may convert the query for determination of the closest match (e.g., lowest distance) within the vector database. In one or more embodiments, for example where the message from the cardholder device or merchant is triggered based on a geolocation pattern, determination of the closest account behavior description(s) may include locating vectors encoding prior transactions with the merchant identifier at issue and involving one or both of the real-time geolocation and/or the known geolocation pattern that triggered the message.

As discussed above, in one or more embodiments, the account behavior description may comprise one or more vectors of the vector database derived from historical transaction data of the cardholder, and/or of one or more third party transaction(s) and/or cardholder or merchant account(s). In one or more embodiments, the account behavior description may be a vector defining aspects of the transaction, and one or both of the account(s) and/or accountholder(s) of the putative transaction, for example encoding historical or current data dimensions, factors and datapoints suspected to be most relevant or useful to the recommendation LLM in authorizing or pre-authorizing the putative transaction. For example, the account behavior description(s) may include or encode any of the following pre-calculated sums for either the customer account or merchant account for the putative transaction: a transaction amount sum of a plurality of historical transaction events of the account satisfying criteria for entity name and timeframe; a historical transaction amount sum of a plurality of transaction events of the account satisfying criteria for merchant category code and timeframe.

In accordance with the discussion above, the vectors of the vector database may be generated and/or revised over time and/or using machine learning (e.g., through labeled or supervised training of the vector database LLM) so that the vectors can be used to populate prompts to support efficient transaction authorization and/or pre-authorization, reduced fraud, improved identification of circumstances in which pre-authorization is desired and appropriate, and identification and application of reasonable limitations to pre-authorization by the recommendation LLM.

Referring to operation 503, a transaction authorization prompt may be generated based on the account behavior description. In one or more embodiments, the prompt will be generated as a natural language narrative, for example including data about the putative transaction, the parties to the putative transaction and/or their devices or habits, and the retrieved account behavior description(s), in each case forming a natural language prompt asking for a recommendation from the recommendation LLM regarding whether and to what extent an authorization or pre-authorization for a putative transaction should be issued. The transaction authorization prompt may include one or more limitation(s) for the request—such as relating to a maximum amount for the transaction—particularly where evident from the retrieved account behavior description(s). As will be appreciated, the account behavior description may be automatically converted from token embeddings to natural language for inclusion in the prompt.

Referring to operation 504, the transaction authorization prompt may be submitted to a second ML model including the recommendation LLM to generate an authorization recommendation.

In one or more embodiments, the recommendation LLM is preliminarily fine-tuned for authorization recommendation based on financial data. For example, the recommendation LLM may be fine-tuned to recognize patterns in transactional data, personally identifiable data, personal life event data, transaction patterns or other data which may be included in transaction authorization prompts which help inform whether a cardholder and/or cardholder device is in a situation in which a pre-authorization or authorization would be appropriate, legitimate, or the like. Preliminary fine-tuning may also/alternatively acclimate the recommendation LLM to one or more languages encountered in the prompt(s), and/or to unique data formats, syntaxes and contents encountered within the financial data context for which it is configured.

The prompt may be configured and engineered to optimize the quality of the output. For example, the prompt may include a significant number of relevant examples relevant to the query it embodies (e.g., for single shot or multi-shot learning)—for example where account behavior description vectors encode data regarding cardholder behaviors associated with previous transactions with particular merchants—and may include a plurality of financial account records or other data types, in each case to provide context to activate the recommendation LLM toward the most likely relevant learned relationships it embodies.

The output includes one or more datums responsive to the query of the prompt. For example, where the prompt seeks a recommendation for whether and to what extent an authorization should be authorized or pre-authorized, the output may be the recommendation including the requested conclusion (i.e., recommending authorization or not) and any recommended limitations for any recommended authorization. The output may be a natural language narrative including and explaining the recommendation.

In one or more embodiments, the output also includes an explanation generated by the recommendation LLM for which learned pattern(s) and/or aspects were most influential in reaching the authorization recommendation. In one or more embodiments, the output may include an indicator of a degree of confidence—for example, expressed as a percentage or on a standardized scale—in its resolution. For example, where the cardholder is very likely involved in fraud in the putative transaction or in its historical transactions, the recommendation LLM may generate its output recommending no authorization be issued with a high degree of confidence. For another example, where the dominant aspects of a prompt or transaction relied on in reaching the recommendation derive from factors having a relatively low correlation, the recommendation LLM may output its recommendation with a relatively low degree of confidence. Accordingly, where the data and vectors of the prompt to the recommendation LLM indicate that a putative transaction is within normal behavioral patterns and appears legitimate, the output may be a recommendation for pre-authorization or authorization up to an appropriate amount and/or with a reasonable timeframe in view of those patterns, and may include an explanation of the primary factors which establish the similarity between the pre-determined patterns and the current facts and data and/or a degree of confidence indicator.

Referring to operation 505, the authorization recommendation may be transmitted with a transaction authorization request to an issuer. It is foreseen that the issuer may host the recommendation LLM and thus generate the authorization recommendation pursuant to operation 504 without departing from the spirit of the present invention. The transaction authorization request may have been initiated by the cardholder device, by a merchant point of sale, or by the payment network. The transaction authorization request may identify the cardholder using a customer account identifier and the merchant using a merchant identifier. The merchant identifier may be one of an entity name, unique entity identifier (such as an account identifier), or a merchant category code.

In one or more embodiments, the payment network will advise the issuer with the, or the issuer will act on its own, recommendation. Moreover, the payment network and/or issuer may additionally apply one or more rules or algorithms, including without limitation its own machine learning model(s), for determining whether to approve the transaction authorization request based on the recommendation. For example, the rule(s) may take into account and/or use as input the recommendation, the degree of confidence indicator, and/or the primary reason(s) for the recommendation, but may additionally embody the issuer's own risk analysis. In one or more embodiments, recommendations provided by a payment network may be used by multiple issuers with varying risk thresholds and preferred analyses using overlayed, customized issuer rules for interpreting the recommendations of the payment network.

The recommended authorization or pre-authorization may also or alternatively be contingent on manual review by the issuer. For example, low confidence indicators (e.g., below a pre-defined threshold) and/or the presence of certain categories of dominant reasons described in the recommendation LLM output, and/or the output of any issuer rule(s) applied to the recommendation LLM output, may trigger manual review rather than automated approval or denial. A confidence indicator falling below a certain percentage, or significant reliance on a fact pattern known to have a high false positive (or negative) identification, may trigger such manual review.

Referring to operation 506, a response to the transaction authorization request may be received from the issuer. In one or more embodiments, the response is received by the payment network and/or merchant, and conveyed to and/or stored by the merchant. For example, the response may be pre-authorization up to a particular dollar amount limit, and the response may be provided to the merchant, such as the merchant the cardholder was projected to visit based on cardholder device data and/or recommendation LLM output discussed in more detail above. Referring to operation 507, the transaction may be processed based on the response. For example, an authorization hold may be preliminarily placed (as described in more detail above) for pre-authorizations (optionally with a sunset), and a merchant may complete the transaction based on the pre-authorization or authorization comprising the response, again as described in more detail in preceding sections.

More particularly, and with brief reference to the example system of FIG. 1, it is noted that the messages within a payment system, such the payment processing system 100 (shown in FIG. 1), in at least some instances, conform to the ISO Standard 8583 specification, which is the ISO standard for systems that exchange electronic transactions made by cardholders using payment devices. In some embodiments, the POS terminal 110 or cardholder device 104 generates or initiates the payment authorization request message including, for example, data corresponding to a terminal ID, amount of the transaction, date of transaction, merchant identifier, merchant location, the payment data received from the cardholder device, and other discretionary data. In other embodiments, such transaction-specific information may be inferred as part of a pre-authorization process discussed above, by some combination of the cardholder device 104, the pre-calculated vectors of the database 120, and/or the recommendation LLM of the payment network 112. The payment authorization request message is transmitted to or generated by the payment network 112 for supplementation with the output of the recommendation LLM as discussed above, for processing and further transmission to an issuing bank, such as the issuer 114 (shown in FIG. 1), for approval.

The POS terminal 110 receives the payment authorization request response message from the issuer 114, for example, via the payment network 112. The payment authorization request response message may include an approval of the transaction. In response to receiving the payment authorization request response message approving the transaction, the merchant 108 and the cardholder 102 may complete the transaction, optionally with the preliminary operation(s) of authorization hold(s) in the case of pre-authorizations.

Advantageously, the systems and methods of the disclosure detailed above support fraud identification and/or transaction approval that is faster and more accurate, owing to technological improvements described herein. For example, in one or more embodiments, pre-calculated, machine-readable vectors are stored in a database for quick and efficient access by automated search logic. The vectors may be identified and retrieved, for example, using real-time semantic searching implemented by a large language model (LLM) in response to a need for a recommendation. In one or more embodiments, the recommendation may relate to whether a transaction should be authorized and/or to resolving a chargeback dispute. The pre-calculated vector(s) retrieved by the search logic LLM may—in the form retrieved and/or as further enriched by account-specific data—be included in a prompt to a second, recommendation LLM. The recommendation LLM may be configured and fine-tuned to provide the recommendation with greater speed and accuracy than existing systems lacking the search logic LLM, the quick-retrieval vector database, and the corresponding recommendation LLM.

The flow from raw, structured data (e.g., of a payment network) to pre-calculated vector(s) capturing relationships, correlations, trends and summaries of account activities facilitated by the unconventional series of machine learning models described herein also represent technological improvements facilitating efficient and accurate fraud identification and/or transaction approval.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one or more embodiments may also be included in other embodiments but is not necessarily included. Thus, the current technology can include a variety of combinations and/or integrations of the embodiments described herein.

The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the invention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the phrases "payment card," "payment device," "transaction card," "financial transaction card," and the like refer to any suitable cashless payment device, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, transponder devices, NFC-enabled devices, and/or computers. Each type of payment card can be used as a method of payment for performing a transaction.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A system for transaction authorization, comprising:

one or more processors; and a memory device storing computer-executable instructions thereon that, when executed by the one or more processors, cause the one or more processors to:

generate, via a first machine learning (ML) model, a database query for real-time authorization of a transaction authorization request, the transaction authorization request including a customer account identifier and a merchant identifier;

retrieve, using the database query, an account behavior description for a customer account identified by the customer account identifier;

generate a transaction authorization prompt based on the account behavior description;

submit the transaction authorization prompt to a second ML model comprising an LLM to generate an authorization recommendation;

transmit the authorization recommendation and the transaction authorization request to an issuer of the customer account;

receive a response to the transaction authorization request from the issuer; and approve or deny a transaction corresponding to the transaction authorization request based on the response.

2. The system in accordance with claim 1, the merchant identifier comprising one or both of an entity name or a merchant category code.

3. The system in accordance with claim 1, the transaction authorization request being for transaction pre-authorization.

4. The system in accordance with claim 3, the transaction authorization request being generated automatically by an application executed by a customer device associated with the customer account, the application automatically generating the transaction authorization request based on a determination that a real-time geolocation of the customer device corresponds to a known geolocation pattern for the customer device.

5. The system in accordance with claim 4, the database query being configured to cause retrieval of the account behavior description based on the merchant identifier and one or both of the real-time geolocation and the known geolocation pattern for the customer device.

6. The system in accordance with claim 3, the response being a transaction pre-authorization for the merchant identifier describing a pre-authorized range of transaction amounts.

7. The system in accordance with claim 6, at least one of the transaction authorization prompt and the authorization recommendation including a recommended pre-authorized range of transaction amounts.

8. The system in accordance with claim 1, the prompt to the second ML model including one or more spending limit guidelines in addition to the account behavior description.

9. The system in accordance with claim 1, the account behavior description including one or both of the following pre-calculated sums: a transaction amount sum of a plurality of transaction events of the account satisfying criteria for entity name and timeframe; a transaction amount sum of a plurality of transaction events of the account satisfying criteria for merchant category code and timeframe.

10. The system in accordance with claim 1, the account behavior description being pre-calculated, the pre-calculated account behavior description being retrieved from a database, the database storing the pre-calculated account behavior description as an n-dimensional vector.

11. Non-transitory computer readable media including computer-executable instructions for transaction authorization that, when executed by at least one processor, cause the at least one processor to:

generate, via a first machine learning (ML) model, a database query for real-time authorization of a transaction authorization request, the transaction authorization request including a customer account identifier and a merchant identifier;

retrieve, using the database query, an account behavior description for a customer account identified by the customer account identifier;

generate a transaction authorization prompt based on the account behavior description;

submit the transaction authorization prompt to a second ML model comprising an LLM to generate an authorization recommendation;

transmit the authorization recommendation and the transaction authorization request to an issuer of the customer account;

receive a response to the transaction authorization request from the issuer; and approve or deny a transaction corresponding to the transaction authorization request based on the response.

12. The non-transitory computer readable media of claim 11, the merchant identifier comprising one or both of an entity name or a merchant category code.

13. The non-transitory computer readable media of claim 11, the transaction authorization request being for transaction pre-authorization.

14. The non-transitory computer readable media of claim 13, the transaction authorization request being generated automatically by an application executed by a customer device associated with the customer account, the application automatically generating the transaction authorization request based on a determination that a real-time geolocation of the customer device corresponds to a known geolocation pattern for the customer device.

15. The non-transitory computer readable media of claim 14, the database query being configured to cause retrieval of the account behavior description based on the merchant identifier and one or both of the real-time geolocation and the known geolocation pattern for the customer device.

16. The non-transitory computer readable media of claim 13, the response being a transaction pre-authorization for the merchant identifier describing a pre-authorized range of transaction amounts.

17. The non-transitory computer readable media of claim 16, at least one of the transaction authorization prompt and the authorization recommendation including a recommended pre-authorized range of transaction amounts.

18. The non-transitory computer readable media of claim 11, the prompt to the second ML model including one or more spending limit guidelines in addition to the account behavior description.

19. The non-transitory computer readable media of claim 11, the account behavior description including one or both of the following pre-calculated sums: a transaction amount sum of a plurality of transaction events of the account satisfying criteria for entity name and timeframe; a transaction amount sum of a plurality of transaction events of the account satisfying criteria for merchant category code and timeframe.

20. The non-transitory computer readable media of claim 11, the account behavior description being pre-calculated, the pre-calculated account behavior description being retrieved from a database, the database storing the pre-calculated account behavior description as an n-dimensional vector.

* * * * *